(12) United States Patent
Zipp

(10) Patent No.: US 6,249,737 B1
(45) Date of Patent: Jun. 19, 2001

(54) VEHICLE PARKING BRAKE SYSTEM

(75) Inventor: Jürgen Zipp, Braunfels (DE)

(73) Assignee: Kuster & Co. GmbH, Ehringshausen (DE)

(*) Notice: Subject to any disclaimer, the term of this patent is extended or adjusted under 35 U.S.C. 154(b) by 0 days.

(21) Appl. No.: 09/380,750
(22) PCT Filed: Mar. 12, 1998
(86) PCT No.: PCT/EP98/01448
§ 371 Date: Nov. 22, 1999
§ 102(e) Date: Nov. 22, 1999
(87) PCT Pub. No.: WO98/40255
PCT Pub. Date: Sep. 17, 1998

(30) Foreign Application Priority Data

Mar. 12, 1997 (DE) .............................. 197 10 006
Sep. 5, 1997 (DE) .............................. 197 38 877

(51) Int. Cl.$^7$ ................ G06F 7/70; G06F 19/00
(52) U.S. Cl. ................ 701/70; 701/78; 701/83; 303/155; 303/167
(58) Field of Search ................ 701/70, 71, 78, 701/83; 303/124, 155, 167

(56) References Cited

U.S. PATENT DOCUMENTS 5,086,868 * 2/1992 Fontaine et al. .............. 180/287
5,558,412 * 9/1996 Kanjo et al. .................. 303/74
5,586,812 * 12/1996 Kanjo et al. .................. 303/7

FOREIGN PATENT DOCUMENTS

| 3909907 | 9/1990 | (DE) . |
| 4205590 | 8/1993 | (DE) . |
| 4205590A1 | 8/1993 | (DE) . |
| 19726188 | 8/1998 | (DE) . |

OTHER PUBLICATIONS

Patent Abstracts of Japan vol. 018, No. 72 (M–1555) Feb. 1994 #05286424.
Patent Abstracts of Japan vol. 012, No. 356 (M–745) Sep. 1988 #63112224.
Patent Abstracts of Japan vol. 015, No. 028 (M–1072) Nov. 1990 #2270667.
Patent Abstract of Japan, Pub.Date Feb. 7, 1994, Appl. No. 4322566.

* cited by examiner

Primary Examiner—William A. Cuchlinski, Jr.
Assistant Examiner—Gertrude Arthur
(74) Attorney, Agent, or Firm—Liniak, Berenato, Longrace & White (57) ABSTRACT

A parking brake system for vehicles, in particular passenger cars, with an extraneous force generating adjusting unit for tightening or loosening at least one actuating pull for a braking arrangement on the vehicle and having an electronic control device whose output variable is used to actuate the adjusting unit. Input variables, in particular from an operating arrangement, sensors and or switches are fed to the control device and the output variable van be varied as a function of the input variable. A force sensor is disposed on or the actuating pull for directly detecting the force exerted thereon. The signals from the force sensor are fed to the control device as an input variable.

19 Claims, 4 Drawing Sheets

VEHICLE PARKING BRAKE SYSTEM

BACKGROUND OF THE INVENTION

The invention relates to a parking brake system for vehicles, in particular passenger cars, having a power-assistance-generating actuator unit for pulling on or releasing at least one control cable for a braking device of the vehicle, having an electronic control device whose output variable is used to activate the actuator unit, the control device being supplied with input variables, in particular from an operator device, from sensors and/or switches or the like, and it being possible to change the output variable as a function of the input variable.

DESCRIPTION OF THE RELATED ART

DE 42 05 590 A1 has already disclosed such a parking brake system for motor vehicles with a foot-activated brake pedal. Here, an additional electromotive actuator unit which acts directly on the brake pedal via a coupling device is provided. By pressing a momentary contact switch which is located, for example, in the operating reach of the vehicle gear mechanism, the direction of rotation of the electric motor of the actuator unit is reversed in each case so that the brake pedal is pivoted downward electromotively and released upward again. The mechanical arresting of the brake pedal is carried out here by means of the actuator unit gear mechanism which is of self-locking design. Furthermore, the design of the coupling device permits the brake pedal to be pressed down by the operator at any time. The parking brake system has an electronic control device with which additional functions can be implemented. Thus, for example the power-assisted parking brake system can be protected against unintentional release by virtue of the fact that after the ignition is switched off the actuator unit is no longer actuated electrically. Also, the detection of the operating current of the electric motor, and the detection of the angle of rotation of the spur gear of the gear mechanism can provide an indication of the braking force and the instantaneous position on the travel path of the brake cable, from which indications of the state of the friction linings of the parking brake system and the state of the braking force-transmitting connecting elements can be obtained. Furthermore, the braking force can also be applied under the control of a characteristic diagram by means of the operating current of the electric motor, in which case an activation speed which is dependent on the travel of the brake cable can also be implemented.

However, the known parking brake system proves disadvantageous insofar as it is extremely inflexible in its handling and takes little account, or no account at all, of the individual load states of the control cable and/or of the braking device. Furthermore, it proves disadvantageous that the activation force which acts on the control cable and/or on the brake takes place indirectly via a measurement of the current flowing into the electric motor of the actuator unit. On the one hand, this measurement method is extremely imprecise since the current flowing into the electric motor of the actuator unit is also dependent on environmental influences such as temperature or the like. On the other hand, it is, at any rate, then impossible to measure a force if the electric motor is out of operation.

Furthermore, JP-A-5-286424 has disclosed a parking brake for motor vehicles in which, after an activation lever is pulled on by the driver, a pressure sensor detects the reaction force of the parking brake which is exerted on a sliding element. In the event of the reaction force which is measured being smaller than a predefined value, an actuator motor is driven in the forward direction with the aid of a controller, the activation lever being raised, together with the sliding element, by means of a cable line. As a result, the intention is that the brake cable will continue to be pulled and the effective force on the parking brake will be increased. As soon as the pressure sensor detects that the activation force has reached a predefined value, the motor is stopped, the activation lever being held in the raised position. A disadvantage with the known system is that the force exerted on the control cable is not directly detected so that the measurement may be subject to considerable errors.

SUMMARY OF THE INVENTION

In contrast to the above, the invention is based on the object of developing a parking brake system for vehicles with the features mentioned at the beginning to the effect that flexible handling is ensured and the individual load states of the parking brake system can be detected reliably and precisely.

This object is essentially achieved according to the invention with the parking brake system having the features mentioned at the beginning in that a force sensor for directly detecting the force which is exerted on the control cable is arranged on or in the control cable, the signals of the force sensor being supplied to the control device as an input variable.

The actuation movement of the power-assistance-generating actuator unit is converted into a translatory movement for activating or pulling on or releasing the control cable for a braking device. A force sensor which directly measures the force acting on the brake line or the brake and passes on this force as an actual value to the control device is arranged on or in the control cable. In particular, with the parking brake system according to the invention it is also possible to measure a force directly when the vehicle is stationary so that continuous monitoring of the braking force at a given moment is made possible without the power-assistance-generating actuator unit having to be in operation. This is not possible with the parking brake system according to the prior art. In this way, the parking brake system according to the invention can be automatically re-adjusted if there is any kind of failure of the braking force, even if the vehicle has been parked in the deactivated state for a relatively long time.

According to a first advantageous refinement of the invention there is provision for the dynamometer to have an elastic element which is arranged on or in the control cable and whose deformation, for example its expansion or torsion, is used to determine the force exerted on the control cable. This makes it possible, in a structurally simple way, to sense the force on the control cable directly. A spring, for example, is possible as the elastic element, said spring being integrated into the control cable or being coupled, at one end of the line, in articulated fashion with respect to the signal transmitter or pickup unit. By sensing the spring travel it is then possible to draw conclusions about the corresponding force.

According to a further advantageous refinement of the invention there is provision for the control cable to be assigned a displacement sensor for sensing the travel of the control cable, the signals of which sensor are supplied to the control device as an input variable. In this way, the travel or adjustment displacement can be sensed by means of the displacement sensor both when pulling on and releasing the brake or the control cable, and can be used, if appropriate, for evaluating the braking characteristics and for possible fault diagnostics. A further advantage is that an additional position detection, by means of limit switches or the like is not necessary as a result of the use of the displacement sensor.

In this context, according to a further development of the invention, it is possible for the control device to have a memory device and a comparator, at least value pairs, "travel of the control cable/force acting on the control cable" being stored as reference values in the memory device and the reference values being compared with the instantaneous values and/or actual values in the comparator. For example, the position of the control cable which has been determined by the displacement sensor can be assigned the corresponding output value of the force sensor, all the data of a braking procedure being stored in the memory device. When there is further parking brake procedure, these stored data are used as reference values. If there are deviations between the measured values (actual values) and the reference values (setpoint values) it is then possible to conclude that the parking brake system is not operating correctly.

According to a further embodiment of the invention, a signaling device can be activated by the comparator if the reference values and instantaneous values have deviations from one another which are above a tolerance threshold.

Furthermore, it is possible for the reference values which are stored in the memory device to be updated or adjusted adaptively so that continuous or long-term changes in the brake system are taken into account in the reference values. As a result, the reference values can be adapted, for example to the setting behavior of the overall system, wear of the brake linings, lengthening of the control cables or the like. This provides a considerably improved diagnostics capability of the parking brake system according to the invention.

Furthermore, one advantageous refinement of the invention provides the possibility for the control device to be supplied, as an input variable, with signals for the force which is to be exerted on the control cable, a force pickup which is coupled to the brake pedal of the vehicle preferably being used as the setpoint value signal transmitter. However, it is also possible for customary electronic operator elements, such a potentiometers, switches, rocker switches, momentary-contact switches or the like, which may be arranged at any location within reach of the driver, to be used as setpoint value signal transmitter. Likewise, it is conceivable to implement the braking force setpoint value by means of a force sensor which is integrated in the brake pedal and which detects the activation force of the brake pedal by the driver and passes it on to the control device. The actual braking procedure is then triggered either automatically, for example when the vehicle comes to a standstill, or by means of a control device, or an activation element such as a switch, rocker switch or the like, being activated. This is possible both when the vehicle is stationary, that is to say for example when it is parked, and when traveling if the parking brake system is to be used as an auxiliary brake, for example when the main brake fails.

Alternatively, it is possible for the control device to be supplied, as an input variable, with signals of an inclination sensor. As a result, the braking force of the parking brake system can be prescribed, as a setpoint value, as a function of the inclination of the vehicle, as a result of which it is ensured that there is optimum adaptation to the respectively required braking force. The actual braking procedure is then either cleared automatically when the vehicle is stationary or else as a result of the control device being activated or the ignition or the like being switched off. Of course, this prescription of the setpoint value of the inclination sensor can be switched off by further activation of the control element and the braking force can be set, for example, to a maximum value.

Furthermore, it has proven advantageous for the actuator unit to be designed as a d.c. motor with a connected or integrated gear mechanism.

According to another advantageous development of the invention, the travel value of the control cable which is necessary to exert a predetermined maximum force value is stored in a memory device while the brake is being pulled on, the control cable being displaced by this stored, preferably constant, travel value by means of the actuator unit in order to release the brake. On the basis of these measures it is possible to carry out automatic length compensation of the control cable. If, for example when the parking brake is pulled on, the control cable has lengthened by a certain value, for example 0.5 mm, this lengthening is removed from the system by virtue of the fact that, in order to release it, the control cable is merely displaced by the amount of travel previously necessary to load it. As a result, the zero point of the system is displaced by the amount of lengthening of the cable so that the slack is removed from the system. Of course, the brake can also be released by force control.

According to a further refinement of the invention, a display device, such as a visual display, for example an LED array, or an audible indicator, with which the instantaneous braking force can be represented, is connected to an output of the control device.

Furthermore, the control device can advantageously be designed as a digital signal transmitter or else a multistep or stepless signal transmitter downstream of a servocontroller. In either a stepped or stepless operating mode, metered pulling on and releasing of the parking brake system can be achieved, which is also advantageous when the parking brake system is used as an auxiliary braking device, for example in the event that the main brake system has failed. The elimination of a mechanical activation device and the use of the electrical operator device makes it possible, as a further advantage, to make a considerable saving in space and to arrange the electrical operator device as desired, since said device does not need to be coupled to the mechanical operator element of the parking brake system. In addition, it is no longer necessary to apply force to activate the parking brake system.

The servocontrol can be provided in the following ways:
 by means of pulse-width modulation (PWM),
 by controlling the amplitude of the voltage of the motor,
 by means of clocked motor voltage with constant mark-to-space ratio,
 by means of on-off operation, for example switching on the motor when the setpoint value changes and switching it off when the actual value and setpoint value correspond.

Of course, the operator device can also be designed as a mechanical control element for pulling on or releasing the control cable.

According to another particularly advantageous embodiment it is possible for an auxiliary braking device to be provided for switching over the parking brake into an auxiliary braking mode in the event of the service brake system failing, the brake pedal having a force pickup as a setpoint value signal transmitter for the parking brake.

In conjunction with a dual-function pedal it is possible to perform emergency activation of the parking brake system so that additional mechanical activation devices, such as hand brake lever or an additional pedal can be dispensed with. Such a dual function of a pedal is described in more detail in the patent application 197 26 188.4, said dual function being included, by express reference, in the disclosures of the earlier application. The emergency activation of the electric parking brake may be designed not only as a mechanical version, for example double pedal, but also as an electrical version by using an additional control unit and, if appropriate, an additional actuator unit (motor with gear mechanism) and possibly an additional battery.

It is also possible for the control device to be supplied, as input variable, with at least one or more of the following signals: signal from the ignition switch, signal from the immobilizer device, signal from the speedometer, signal from a brake light switch, signals from the antilock brake system, signals from a door lock contact, signals from a diagnostics device. Various refinements of the parking brake system are possible on the basis of these measures. For example, a safety position may be implemented, for example, as a child safety system, by virtue of the fact that the parking brake system or the operator device can be activated in particular only when the ignition is switched on or the key is in the ignition lock, or the parking brake system or the operator device is coupled to the immobilizer device. As a result, a certain level of protection against theft is also provided. Of course, the parking brake system can be pulled on at any time, irrespective of the position of the ignition lock.

However, in this context it is also possible that, if appropriate, the vehicle speed is additionally sensed in order to distinguish between the vehicle traveling and the vehicle being stationary, so as to distinguish between the sparking "braking" and "auxiliary braking" modes of operation, for example in the event of the service brake system of the vehicle failing.

Also, the activation of the brake pedal can be logically linked or coupled, for example via a brake light switch, to the actual control device so that unintentional activation of the parking braking device while traveling can be avoided or prevented if the control device happens to be inadvertently activated. In this context it is also possible for a visual or audible warning signal to be issued initially when unintentional activation takes place, without the parking brake process having been activated. This could then take place, for example, when the control element is activated once more. Also, the parking brake system can be released automatically and/or an audible signal can be issued when a journey is started if the parking brake has not been released before the journey begins. The criterion for this can be derived, for example, from the speed sensor, it being then necessary to make a distinction between the states of the vehicle in which the speed is zero and those in which the speed is greater than zero. By virtue of the fact that the control device is also provided with signals from the antilock brake system, it is possible to avoid overbraking in certain situations by means of the parking brake system. Furthermore, it is also possible to provide a visual display which indicates, for example by means of a signaling light or the like, that the predefined braking force has been reached.

The parking brake system according to the invention also permits an extensive diagnostics capability by virtue of the sensing of the adjustment displacement of the control cable and the force acting on this control cable. In this way it is possible, for example, to detect readily a defect in the actuator unit, the sensor system, the activation means or even to detect a rupture in the control cable. In order to detect faults and limit the current the motor current is measured or the duration of a braking procedure is determined. However, it is also possible to predefine a time window in which the braking procedure must be terminated.

According to a further refinement it is possible for the parking brake system to be changed automatically into the auxiliary braking mode by the auxiliary braking device when a fault is diagnosed in the service brake system of the vehicle. If a defect in the actual service brake is detected by the diagnostics device, an auxiliary braking operation can be carried out automatically using the parking brake system according to the invention by activating the brake pedal. This can be implemented in particular by using a force sensor, which is arranged or integrated in or on the brake pedal, to determine the activation force acting on the pedal. During the automatic switching over to the electrical parking brake system, it is of course also possible to process the influences of the antilock brake system when the desired braking effect is achieved. The advantage is that time is not wasted on thinking about changeover (reaction time).

It is also possible for the force which is exerted on the control cable by the actuator unit to be limited to an upper limiting value by means of a limiting device. In this way, by using the force sensor, it is possible to limit the force acting on the control cable or the brake, in order to avoid overstressing the control cable. As a result, the parking brake system according to the invention is further improved as a safety promoting component in its function over and beyond the customary safety standard. It goes without saying that this measure also further lengthens the service life of the control cable between the signal transmitter and the pickup.

Further objectives, advantages, features and application possibilities of the present invention emerge from the following description of the exemplary embodiment with reference to the drawings. Here, all the described and/or illustrated features form, either independently or in any desired appropriate combination, the subject-matter of the present invention, even independently of their combination in the claims or their backward reference.

DETAILED DESCRIPTION OF THE PREFERRED EMBODIMENT

Figure 1:
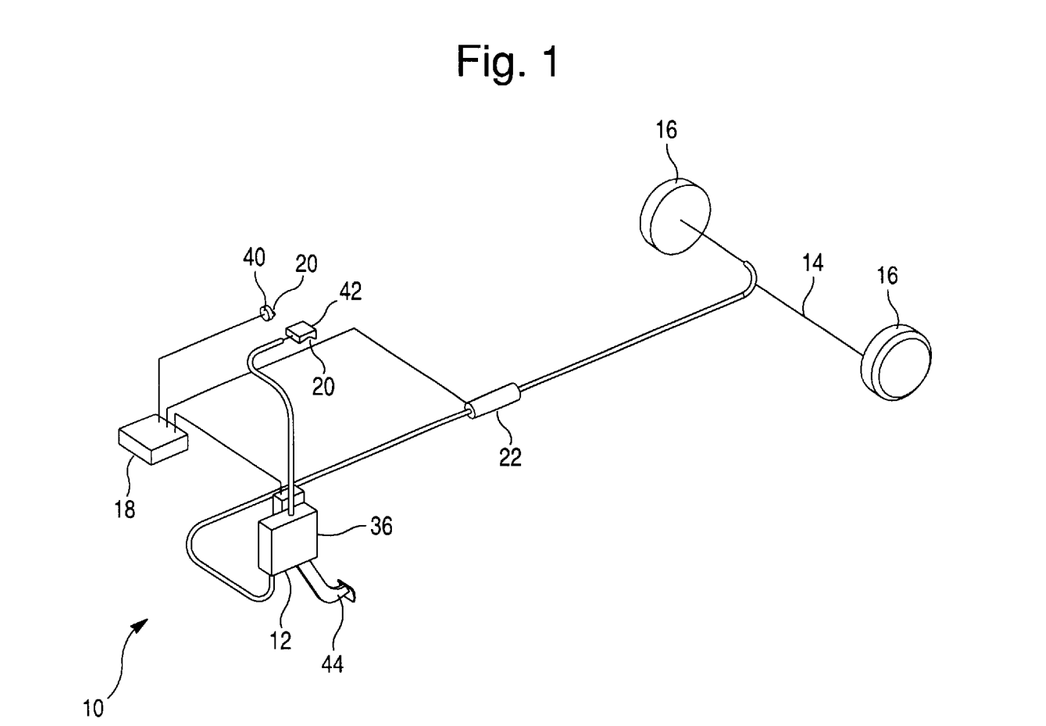
FIG. 1 shows a schematic view of an exemplary embodiment of the parking brake system according to the invention.

As is clear from FIG. 1 the parking brake system 10 has a power-assistance-generating actuator unit 12 for pulling on or releasing at least one control cable 14 for a braking device 16 of a vehicle, in particular of a motor vehicle. An electronic control device 18 is used to activate the actuator unit 12, it being possible to supply the control device 18 with input variables, in particular from an operator unit 20 and to a force sensor 22. The output variable of the control device 18 can be changed as a function of the input variables. The force sensor 22 is assigned to the control cable 14 and directly senses the force exerted on the control cable 14 by means of the actuator unit 12. The signals from the force sensor 22 are fed, as an input variable, to the control device 18.

The force sensor 22, or the dynamometer, preferably has an elastic element whose deformation, in particular whose expansion or torsion, is used to determine the force on the control cable 14. In particular a spring is suitable as the elastic element.

The operator unit 20 can be designed as an electrical signal transmitter 40 or else as a mechanical operator element 42 for releasing and pulling on the parking brake system 10. The actuator unit primarily 12 is composed of a d.c. electric motor to which a gear mechanism 36 is connected. The operator unit 20 can be activated, for example manually, by the driver of the vehicle in order to control the parking brake system 10. A mechanical emergency activation of the parking brake system 10 can be carried out by means of a pedal 44 or the like. The parking brake system 10 can be pulled on or released by means of the operator device 20. In addition, or as an alternative, a signal transmitter 40, with which the setpoint value for the brake force which is to be set by the actuator unit 12 can be input, is provided. The signal transmitter 40 and the operator unit 20 can, for example, also be integrated in the operator element 42. The emergency activation is thus a standby function of the electric parking brake.

Figure 2:
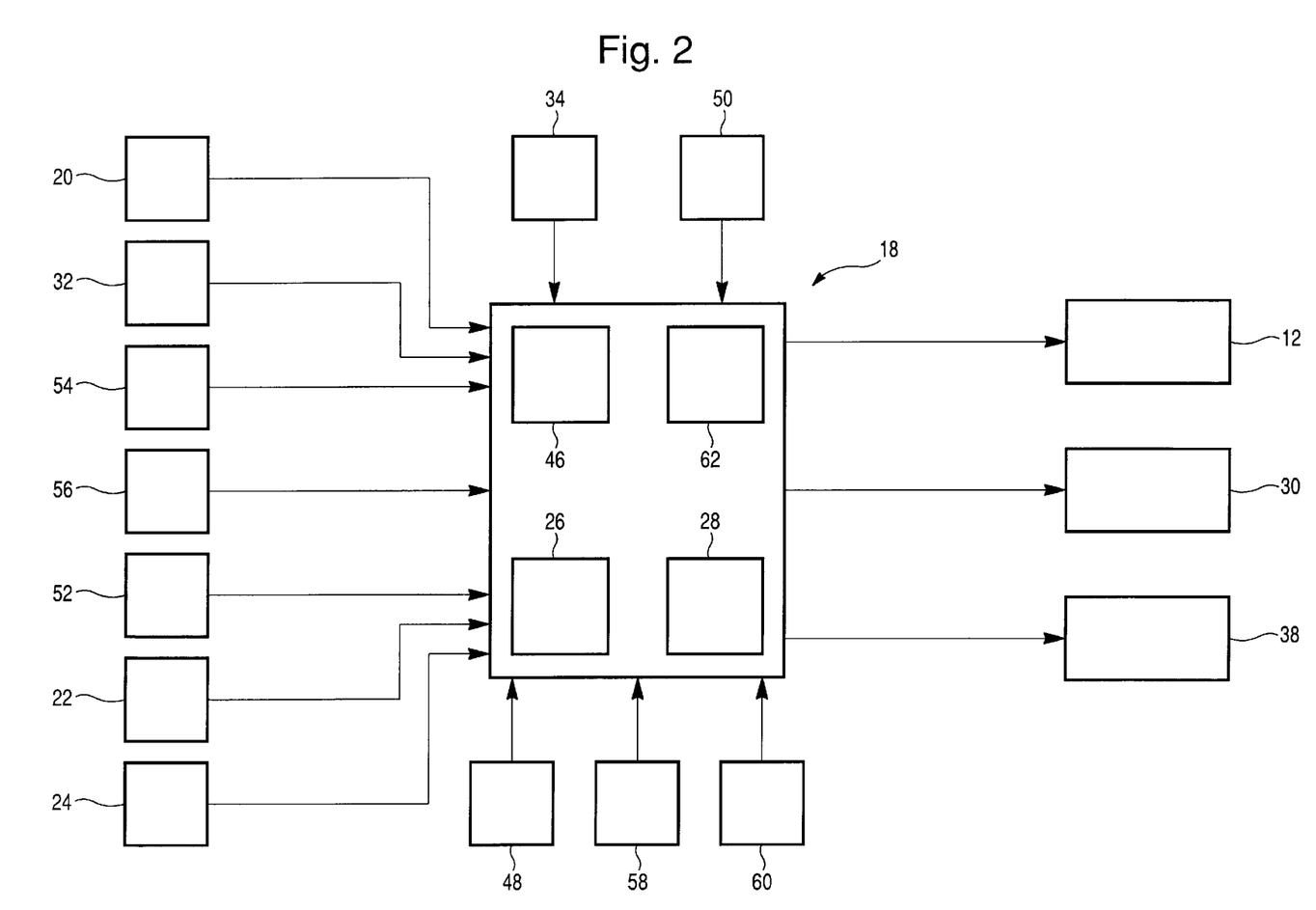
FIG. 2 shows an exemplary embodiment of a block circuit diagram of the control device for the parking brake system according to the invention.

Furthermore, the control cable 14 is assigned a displacement sensor 24 for sensing the travel of the control cable 14, the signals of which sensor are fed, as an input variable, to the control device 10, as is clear in particular from FIG. 2. The control device 18 has a memory device 26 and a comparator 28, data or pairs of data items relating to the "travel" of the control cable 14 and the force acting on the control cable 14 being stored as reference values or setpoint values in the memory device 26 and the reference values being compared with the instantaneous values in the comparator 28. If the reference values and instantaneous values relating to the travel or the force have deviations from one another which are above a tolerance threshold, a signaling device 30 can be activated by the comparator 28. It is also possible to update or adaptively adjust the reference values stored in the memory device 26, so that continuous or longterm changes in the brake system are taken into account in the reference values.

The control device 18 is supplied, as an input variable, with signals for the force which is to be exerted on the control cable as setpoint values, a force pickup 32 or a potentiometer, rocker or the like which is coupled to the brake pedal of the vehicle is used as the setpoint valve sensor. Furthermore, the control device 18 can be supplied, as an input variable, with signals of an inclination sensor 34 so that the setpoint value of the force or braking force which is to be exerted on the control cable 14 can be dependent on the position of the vehicle. That travel value of the control cable 14 which is necessary to exert a force value which does not correspond to the maximum force is stored, while the brake or control cable 14 is being pulled on by means of the actuator unit 12, in a memory device 26 so that the control cable 14 is displaced by the stored travel value by means of the actuator unit 12 in order to release the brake.

A display device 38, for example an LED array or an audible indicator with which the instantaneous braking force can be represented, is connected to an output of the control device 18.

The operator device 20 can be designed, for example, as a multistage, stageless or digital signal transmitter 40. Of course, it is also possible for the operator device 20 to be stored as a mechanical operator element 42 is designed merely for pulling on or releasing the control cable 14.

In the event of the service brake of the vehicle failing, a braking device is provided for switching over the parking brake into an auxiliary braking mode, the brake pedal having a force pickup 32 as setpoint value signal transmitter for the parking brake. The control device 18 can be fed, as further input variables, with one or more of the following signals: signal from the ignition switch 48, signal from the immobilizer 50, signal from the speedometer 52, signal from the brake light switch 54, signal from the antilock brake system 56, signals from a door lock contact 58 or else signals from a diagnostic device 60. In the event of a fault being diagnosed in the service brake system of the vehicle, it is then possible to change the parking brake system 10 to be changed automatically into the auxiliary braking mode by the auxiliary braking device. Finally, the force which is exerted on the control cable 14 by the actuator unit 12 can be limited to an upper limiting value by means of a limiting device 62.

Figure 3:
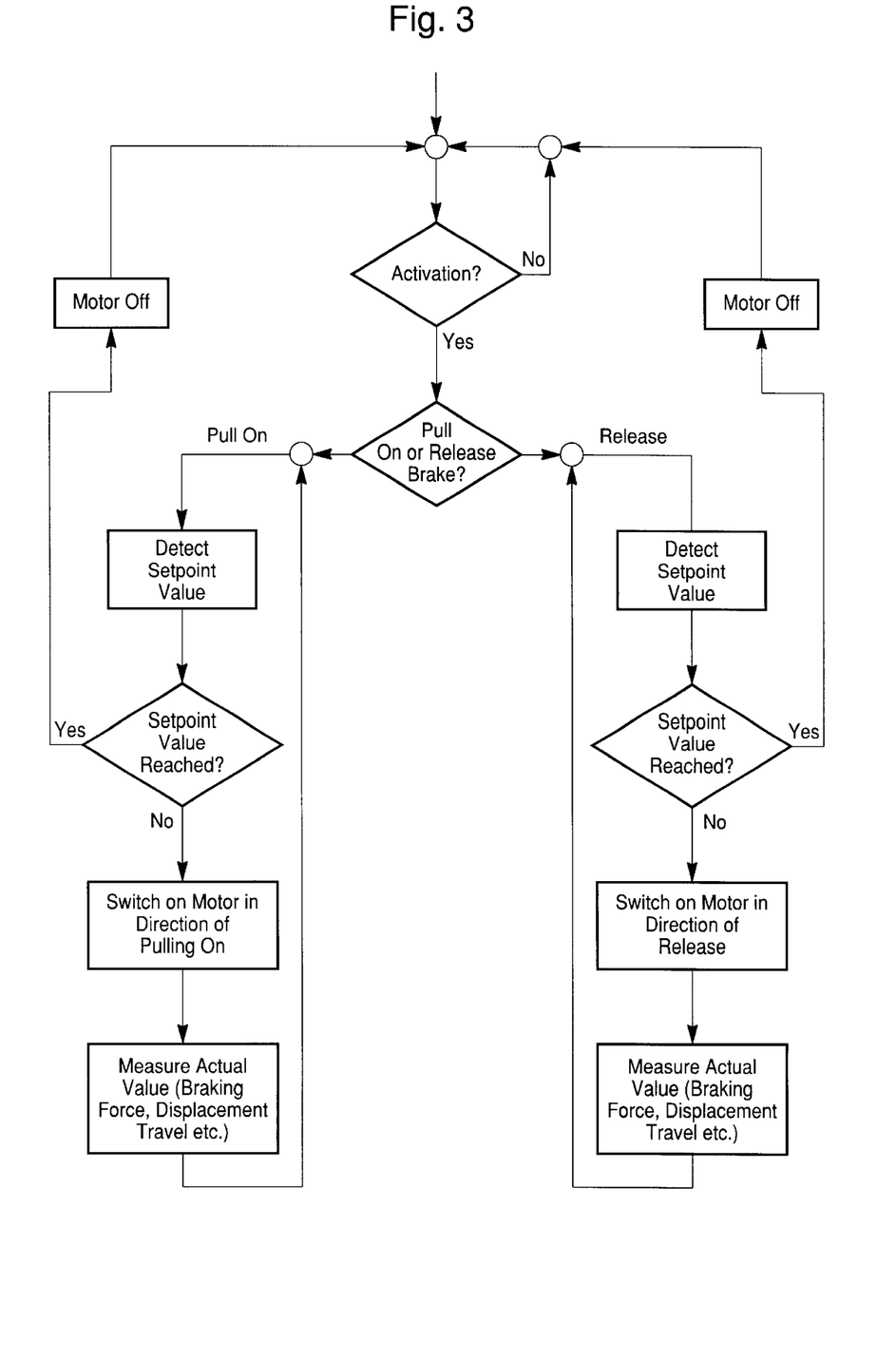
FIG. 3 shows an exemplary structogram or flowchart of the method of operation of the electronic control device which can be implemented by means of a microcontroller, for example.

According to the structogram or flowchart of a possible configuration of the control device 18 which is illustrated in FIG. 3, it is initially determined whether activation of the parking brake system 10 is requested by means of the operator device 20. If this is the case, it is tested whether the parking brake system 10 is to be pulled on or released, and initially a desired setpoint value, for example for the braking force, or else the travel of the control cable 14 is detected in each case. The actuator unit 12 is then correspondingly activated, specifically until the detected actual value, by means of the force sensor 22, the displacement sensor 24 or other sensors, corresponds to the setpoint value. As soon as the setpoint value has been reached, the actuator unit 12 or the motor is switched off. If the setpoint value has not yet been reached, the actuator unit 12 is left in the switched-on state, the instantaneous actual value, for example of the braking force or of the displacement travel of the control cable is measured, compared with the respectively recorded setpoint value and checked for correspondence. If correspondence between the setpoint value and actual value is not achieved, the actuator unit is switched off again.

Figure 4:
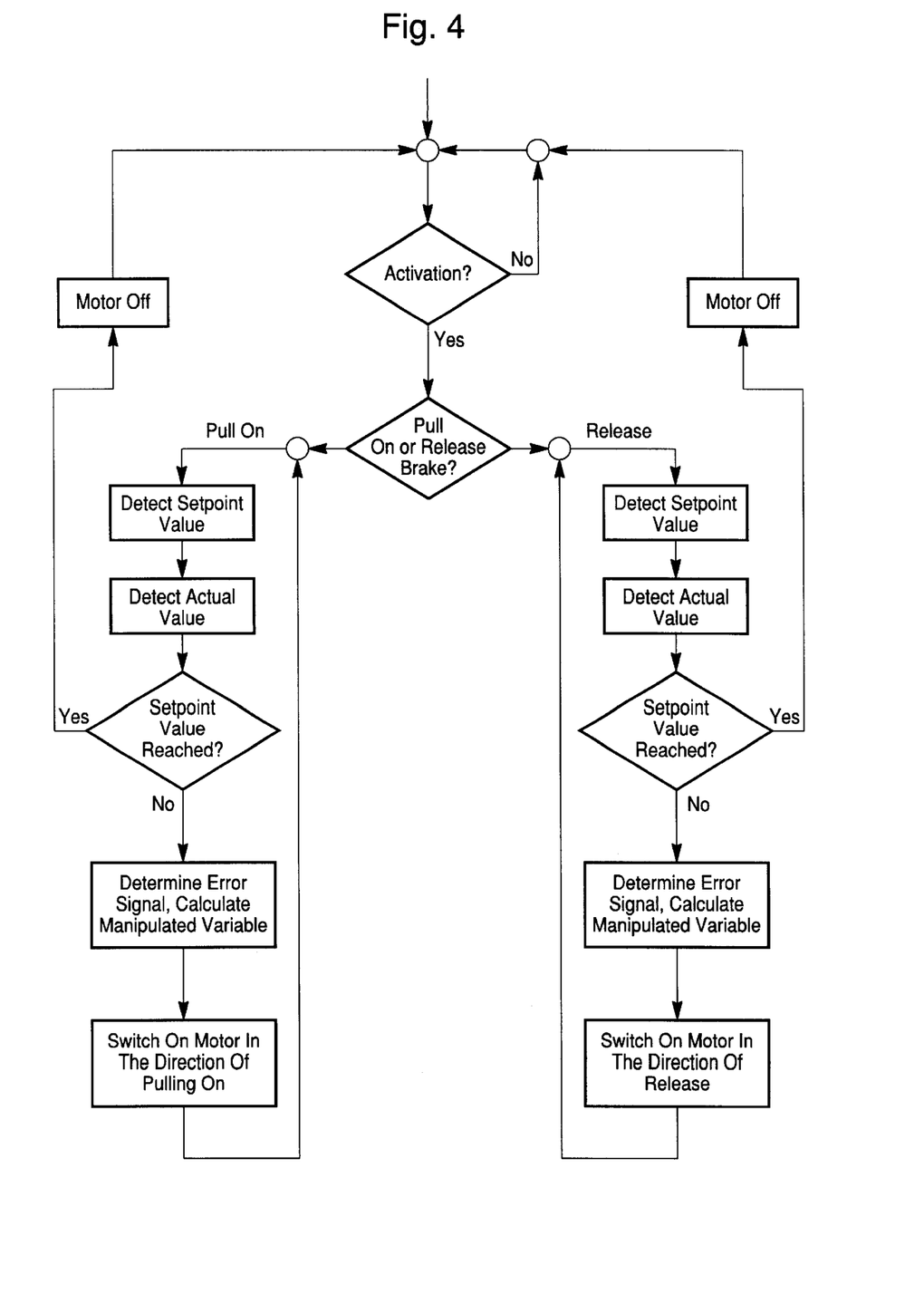
FIG. 4 shows a further structogram or flowchart of a further exemplary embodiment of the electronic control device.

According to the structogram or flowchart of a further possible configuration of the control device 18 which is given in FIG. 4, it is initially detected whether activation of the parking brake system 10 is requested by means of the operator system 20. If this is the case it is tested whether the parking brake system 10 is to be pulled on or released, and initially a desired setpoint value, for example for the braking force, or else the travel of the control cable 14 is detected in each case. Then the corresponding actual value is determined and it is tested whether the desired setpoint value has been reached. If this is not the case, an error signal is determined, for example, from the setpoint value and actual value, and therefrom a manipulated variable, for example a pulse width-modulated signal, a control voltage or a clock signal, with which the servocontrol of the actuator unit is performed, is obtained from said signal. The actuator unit 12 is then correspondingly activated, specifically until the detected actual value, by means of the force sensor 22, the displacement sensor 24 or other sensors, corresponds to the setpoint value. As soon as the setpoint value has been reached, the actuator unit 12 or the motor is switched off. If the setpoint value has not yet been reached, the actuator unit 13 is left in the switched-on state, the instantaneous actual value, for example of the braking force or of the displacement travel of the control cable is measured, compared with the respectively detected setpoint value and checked for correspondence. In this context, the manipulated variable is newly calculated for each pass through the control loop. Once correspondence between the setpoint value and actual value has been achieved, the actuator unit is switched off again.

Basically two input variables are necessary to activate the parking brake. These input variables are generated by the triggering device and the setpoint value specifying system. While the triggering device is designed as a momentary-contact switch, switch, brake light contact, rocker or the like, the setpoint values are specified by means of a potentiometer, an inclination sensor, force pickup in the brake pedal or the like. The triggering device and setpoint value specifying system can be implemented separately, for example as a push-button key and inclination sensor, or else together by means of an operator element, for example potentiometer.

Basically three types of electric parking brakes can be provided:

In the case of a digital parking brake, the brake is set to a prescribed maximum force which cannot be changed by the driver. The electric parking brake is released by a prescribed amount of displacement which cannot be changed by the driver either and which is either determined in an initialization routine or permanently prescribed as a constant in a nonvolatile memory. However, this is only possible if the abovementioned nonvariable maximum force has been set. The compensation of length is performed in this way.

However, if the brake is released before this force is reached, the displacement which has been measured until then for the respective pulling on of the brake is used to release it. There is no compensation of length here. A triggering device (momentary-contact switch, switch or the like) is sufficient as the operating element because the setpoint value is of course permanently prescribed.

In the case of the stepless electric parking brake (servocontrolled), the brake is pulled on to a force which is prescribed by the setpoint value transmitter. The brake is released by the permanently prescribed amount of displacement (see digital electric parking brake) when the setpoint value corresponds to the maximum force. The compensation of length is carried out in this way. In all other cases, the brake experiences the amount of displacement which is measured during the respective pulling on of the brake. A triggering device and a setpoint value transmitter are required to operate it.

A stepped electric parking brake (servocontrolled) is similar to the stepless version, but it has coarser gradation of the possible braking forces.

The emergency activation is the standby function of the electric parking brake, not of the service brake. This function may be of purely mechanical design (double-function pedal) or else be a second electric parking brake.

The force pickup in the brake pedal is used to detect the activation force of the driver applied to the brake pedal and is used as a setpoint value specifying system. This does not correspond to the pedal having a double function, nor is it provided for the clutch pedal.

A compensation of length is carried out by releasing the brake by a constant amount of displacement but only if the electric parking brake has been pulled on to the maximum force. This constant displacement is either determined in an initialization routine and then no longer changed or is already stored in a nonvolatile memory (EPROM, EEPROM) before the vehicle is put into service.

Key for FIG. 3
1=Motor off
2=Activation
3=No
4=Yes
5=Pull on
6=Release
7=Pull on or release brake?
8=Detect setpoint value
9=Setpoint value reached?
10=Switch on motor in direction of pulling on
11=Measure actual value (braking force, displacement travel etc.)
12=Detect setpoint value
13=Setpoint value reached?
14=Switch on motor in direction of release
15=Measure actual value (braking force, displacement travel etc.)

REPLACEMENT SHEET (RULE 26)

Key for FIG. 4
1=Motor off
2=Activation
3=No
4=Yes
5=Pull on
6=Release
7=Pull on or release brake?
8=Detect setpoint value
9=Detect actual value
10=Setpoint value reached?
11=Determine error signal, calculate manipulated variable.
12=Switch on motor in the direction of pulling on
13=Detect setpoint value
14=Detect actual value
15=Setpoint value reached?
16=Determine error signal, calculate manipulated variable
17=Switch on motor in direction of release

REPLACEMENT SHEET (RULE 26)

What is claimed is:

1. A parking brake system (10) for vehicles, having a power assistance generating actuator unit (12) for pulling or releasing at least one control cable (14) for a braking device (16) of the vehicle, having an electronic control device (18) whose output variable is used to activate the actuator unit (12), the control device (18) being supplied with input variables, in particular from an operator device (20), from sensors and/or switches or the like, and it being possible to change the output variable as a function of the input variable, wherein a force sensor (22) for directly sensing the force exerted on the control cable (14) is arranged on or in the control cable (14), the signals of the force sensor (22) being supplied to the control device (18) as an input variable, wherein the control cable (14) is assigned a displacement sensor (24) for sensing the travel of the control cable (14), the signals of which sensor (24) are supplied to the control device (18) as an input variable and the control device (18) has a memory device (26) and a comparator (28), one of at least pairs of values and pairs of data items being stored as reference values in the memory device (26) and the reference values being compared with the current values in the comparator (28).

2. The parking brake system as claimed in claim 1, wherein the force sensor (22) has an elastic element which is arranged on or in the control cable (14) and whose deformation is used to determine the force exerted on the control cable (14).

3. The parking brake system as claimed in claim 1, wherein a signaling device (30) can be activated by the comparator (28) if the reference values and instantaneous values have deviations from one another which lie above a tolerance threshold.

4. The parking brake system as claimed in claim 3, wherein the reference values stored in the memory device (26) are updated or adaptively adjusted so that continuous or long-term changes in the brake system are taken into account in the reference values.

5. The parking brake system as claimed in claim 1, wherein the control device (18) is supplied, as input variable, with signals for the force which is to be exerted on the control cable (14), a force pickup (32) which is coupled to the brake pedal of the vehicle being used as setpoint value signal transmitter.

6. The parking brake system as claimed in claim 1, wherein the control device (18) is supplied, as setpoint value signal transmitter, with signals of an inclination sensor (34).

7. The parking brake system as claimed in claim 1, wherein a potentiometer, the activation period of a momentary-contact switch, a rocker or the like, is used as setpoint value signal transmitter.

8. The parking brake system as claimed in claim 1, wherein the actuator unit (12) is designed as a d.c. motor with connected or integrated gear mechanism (36).

9. The parking brake system as claimed in claim 1, herein a travel value of the control cable (14) which is necessary to exert a redetermined force value during the process of pulling on the brake is stored in the memory device (26), and the control cable (14) is moved by a preferably constant travel value by means of the actuator unit (12) in order to release the brake.

10. The parking brake system as claimed in claim 1, wherein a display device (38),such as a visual display, for example an LED array or an audible indicator, with which a current brake force values can be represented, is connected to an output of the control device (18).

11. The parking brake system as claimed in claim 1, wherein the operator device (20) is designed as a single-stage, multistage or stageless signal transmitter (40).

12. The parking brake system as claimed in claim 1, wherein the operator device (20) is designed as a mechanical operator element (42) for pulling on or releasing the control cable (14).

13. The parking brake system as claimed in claim 1, wherein, in the event of a service brake system failing, an auxiliary braking device (46) is provided for switching over the parking brake system into an auxiliary braking mode, if appropriate a pedal (44) preferably the brake pedal, having a force pickup (32) as setpoint value signal transmitter for the parking brake system and/or the braking force which is to be set, or an additional control unit and/or an additional actuator unit (12) and/or an additional battery being provided.

14. The parking brake system as claimed in claim 1, wherein the control device (18) is supplied, as input variable, with at least one of the following signals: signal from a ignition switch (48), signal from a immobilizer device (50), signal from a speed meter (52), signal from a brake light switch (54), signal from a antilock brake system (56), signals from a door lock contact (58), signals from a diagnostic device (60).

15. The parking brake system as claimed in claim 1, wherein, in the event of a fault being diagnosed in a service brake system of the vehicle, the parking brake system (10) is automatically changed over from an auxiliary braking device (46) into an auxiliary braking mode.

16. The parking brake system as claimed in claim 1, wherein the force which is exerted on the control cable (14) by the actuator unit (12) is limited to an upper limiting value by means of a limiting device (62).

17. The parking brake system as claimed in claim 1, wherein, in order to diagnose one of a fault, a motor current of the actuator unit(12), a duration of a braking procedure and the time by which the prescribed duration of the braking procedure is exceeded are measured.

18. The parking brake system as claimed in claim 1, wherein the activation of the actuator unit (12) takes place under servocontrol.

19. The parking brake system as claimed in claim 18, wherein the servo control is carried out by means of pulse width modulation, by regulating the amplitude of one of a motor voltage, by means of clocked motor voltage with constant mark-to-space ratio, and a by on-off operation of a motor of the actuator device (12).

* * * * *